United States Patent
Hohner et al.

(10) Patent No.: US 7,087,668 B2
(45) Date of Patent: Aug. 8, 2006

(54) DISPERSION OF PIGMENTS IN POLYOLEFINS

(75) Inventors: Gerd Hohner, Gersthofen (DE); Rainer Bott, Gross-Gerau (DE); Reiner Hess, Gersthofen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/220,077

(22) PCT Filed: Feb. 15, 2001

(86) PCT No.: PCT/EP01/01668

§ 371 (c)(1), (2), (4) Date: Aug. 27, 2002

(87) PCT Pub. No.: WO01/64800

PCT Pub. Date: Sep. 7, 2001

(65) Prior Publication Data

US 2003/0022978 A1    Jan. 30, 2003

(30) Foreign Application Priority Data

Mar. 1, 2000 (DE) ................ 100 09 752
Dec. 20, 2000 (DE) ................ 100 63 423

(51) Int. Cl.
*C08J 3/22* (2006.01)
(52) U.S. Cl. ............ 524/487; 524/489; 524/490
(58) Field of Classification Search ........ 524/487, 524/489, 490
See application file for complete search history.

(56) References Cited

U.S. PATENT DOCUMENTS

| 6,133,490 A * | 10/2000 | Toyoda et al. ............ 585/9 |
| 6,143,846 A | 11/2000 | Herrmann et al. .......... 526/170 |
| 6,384,148 B1 | 5/2002 | Herrmann et al. ....... 525/333.8 |
| 6,407,189 B1 | 6/2002 | Herrmann ............. 526/160 |
| 6,812,274 B1 | 11/2004 | Deckers et al. .......... 526/170 |

FOREIGN PATENT DOCUMENTS

| EP | 0 705 875 | 4/1996 |
| EP | 0 719 802 | 7/1996 |
| EP | 0 890 584 | 1/1999 |
| EP | 0 902 045 | 3/1999 |
| EP | 1 013 672 | 6/2000 |
| WO | WO 93/10192 | 5/1993 |
| WO | WO 0144387 | 6/2001 |

OTHER PUBLICATIONS

U.S. Appl. No. 11/182,467, by Lechner et al., filed Jul. 15, 2005.
English abstract for JP 08-269140, Oct. 15, 1996.
English Translation of PCT IPCR for PCT/EP 02/01668, mailed Mar. 25, 2002.
EPO Communication Pursuant to Article 92 (2) EPO for Application No. 0195772-2102, mailed Oct. 5, 2002.

* cited by examiner

*Primary Examiner*—Peter D. Mulcahy
(74) *Attorney, Agent, or Firm*—Anthony A. Bisulca

(57) ABSTRACT

The invention is directed to a polymer and pigment composition utilizing a polyolefin wax produced by metallocene catalysis as a pigment dispersing auxiliary.

15 Claims, No Drawings

DISPERSION OF PIGMENTS IN POLYOLEFINS

The present invention relates to a process for improved preparation of a colorant composed of at least one chromophore which is dispersed very finely in a meltable base material (matrix) which is solid at room temperature, and also to the use of polyolefin waxes prepared using metallocene catalysts for improving the dispersing of the colorant in a polyethylene matrix for the purpose of producing polyethylene (LD) films.

Colorants such as pigment preparations, for example, are suitable for producing masterbatches. A masterbatch is a granular, dust-free concentrate of a plastomeric or elastomeric polymer comprising a high fraction of a colorant. Masterbatches are used to color plastics, being added to the plastic to be colored prior to processing, e.g., in injection molding or before extrusion. The direct coloring of plastics with straight dyes prior to processing has been found industrially to be disadvantageous, on account of the fact that
a) the distribution of the colorant and hence the color intensity achieved (color strength) is inadequate, and
b) the health risks due to fine colorant dusts are inestimable, and
c) the costs of cleaning apparatus following use of the colorant or when the colorant is changed are very high.

A variety of processes for producing masterbatches are known and have been described. The following processes are industry standard in the production of masterbatches:
a) the hot mixing of a suitable matrix (polymers such as PVC or ethylene-vinyl acetate, and LDPE) with the colorant
b) extrusion and kneading with subsequent grinding of the colorant concentrate, or
c) extrusion and subsequent fine spraying or hot chopping at the die plate.

An overview is given below of the present state of the art in producing dust-free, pulverulent or granular dye or pigment concentrates.

WO-93/10192 describes the preparation of fluorescent-pigment concentrates using the pigment, a polymer, which may be alternatively a polyester, a melamine-formaldehyde resin or a triazine-formaldehyde resin, a fluorescent dye, and a copolymer of ethylene and carbon monoxide as dispersing auxiliary. A mixture indicated here as a base formulation contains from 0 to 46% polyethylene, 35% fluorescent pigment, 10% filler, 2% titanium dioxide, 2% Silcron® G-100, and from 5 to 51% waxlike dispersing auxiliary, a copolymer of carbon monoxide and ethylene. These waxlike dispersing auxiliaries do acquire a polar functionality that facilitates the wetting of the pigment, owing to their carbon monoxide content, but this functionality is a disadvantage when the thermal stability of the resulting pigment concentrate is considered. In the course of their preparation and subsequent processing, particularly in the case of multiple extrusion, pigment concentrates are exposed to high temperature loads; in other words, an increasing intrinsic color of the dispersing auxiliary under this temperature load is a technical advantage here.

EP-A-0 705 875 describes a universal masterbatch for adding fillers and especially pigments to polymers, being composed of not more than 85% of a filler (e.g. carbon black, titanium dioxide or ultramarine blue) and not more than 25% of a viscosity adjusting auxiliary, specifically either ethylenebisstearylamide (EBS wax), polybutylene or hot melt acrylates and a third component which makes up the remainder of the mixture, namely styrene-butadiene block copolymers. The mixture further comprises as processing auxiliaries either a metal stearate or stearic acid, other organic stearates or a fluoroelastomer, in total not more than 2% by weight. The mixture further comprises an antioxidant. The inorganic pigment fraction is from 30 to 60%. The mixtures are relatively complex; quality criteria cited are the mechanical properties of the end products, without going into other important details such as processing properties, tack, migration or printability of the end product.

As is known, stearates, and also EBS wax, leave much to be desired as auxiliaries in the preparation of pigment concentrates, owing to their strong tendency to migrate under the abovementioned temperature loads. Moreover, as a result of the large number of components in small proportions, an entry point exists for possible errors in preparation and further processing.

EP-A-0 902 045 describes a masterbatch composition which gives improved coloring properties in thermoplastics by using a pigment-containing masterbatch. The masterbatch composition described comprises a polymer prepared by means of metallocene catalyst, said polymer being intended to enhance dispersion of the pigment as a result of its good compatibility therewith. For a granulated colorant masterbatch the pigment fraction is not more than 80%, though no specific example is given. The polymer content is situated at not more than 20% by weight of a polymer prepared using a metallocene catalyst and having a polydispersity of max. 3.5. Additionally, the specification contains references to the addition of further auxiliaries, such as antistats, antiblocking additives, and plasticizers, for example.

In the prior art the process for producing colorant concentrates has not been satisfactorily disclosed, since quality criteria such as color strength or filter index remain disregarded. It is therefore not possible to perceive how, and to what extent, the better dispersing of pigments, which is said to be an advantage, affects such quality criteria.

The object on which the present invention is based was therefore to obtain an improvement in the dispersing of pigments, especially organic pigments, in polyethylene as a matrix for producing films by a suitable choice of components from the group of polyolefin waxes set out below.

Surprisingly it has now been found that waxes obtained by metallocene catalysis bring about very good dispersing of pigments in polymers and are therefore highly suitable for producing masterbatches.

The invention accordingly provides for the use of polyolefin waxes synthesized by means of metallocene catalysts as dispersing auxiliaries for pigments in a polymer matrix.

The invention further provides a process for producing a masterbatch by blending a polymer with a colorant, characterized by the admixing of at least one polyolefin wax obtained by metallocene catalysis.

Suitable polyolefin waxes include homopolymers of ethylene or copolymers of ethylene with one or more olefins. Olefins used are linear or branched olefins having 3–18 carbon atoms, preferably 3–6 carbon atoms. Examples thereof are propene, 1-butene, 1-hexene, 1-octene or 1-octadecene, and also styrene. Copolymers of ethylene with propene or 1-butene are preferred. The ethylene content of the copolymers is from 70 to 99.9% by weight, preferably from 80 to 99% by weight.

Especially suitable polyolefin waxes are those having a dropping point of between 90 and 130° C., preferably between 100 and 120° C., a melt viscosity at 140° C. of between 10 and 10 000 mPa·s, preferably between 50 and 5 000 mPa·s, and a density at 20° C. of between 0.89 and 0.98 g/cm$^3$, preferably between 0.91 and 0.94 g/cm$^3$.

The waxes may be used both per se and in polar-modified form. Modification options, which are known per se, include, for example, oxidation with air or graft polymerization with polar monomers, maleic anhydride for example.

In preferred embodiments of the invention the metallocene waxes used in accordance with the invention are employed in a blend of auxiliaries and additives which enhance the dispersing effect of metallocene waxes. Such auxiliaries and additives comprise, for example,
a) polyethylene glycol
b) PE waxes
c) PTFE waxes
d) PP waxes
e) amide waxes
f) FT paraffins
g) montan waxes
h) natural waxes
i) macrocrystalline and microcrystalline paraffins,
j) polar polyolefin waxes, or
k) sorbitan esters
l) polyamides
m) polyolefins
n) PTFE
o) wetting agents,
p) silicates.

Additive a) comprises polyethylene glycol, molecular weight range preferably from 10 to 50 000 daltons, in particular from 20 to 35 000 daltons. The polyethylene glycol is admixed in amounts of preferably up to 5% by weight to the metallocene wax composition.

Additive b) comprises, in preferred embodiments, polyethylene homopolymer and copolymer waxes which have not been prepared by means of metallocene catalysis and which have a number-average molecular weight of from 700 to 10 000 g/mol with a dropping point of between 80 and 140° C.

Additive c) comprises, in preferred embodiments, polytetrafluoroethylene having a molecular weight of between 30 000 and 2 000 000 g/mol, in particular between 100 000 and 1 000 000 g/mol.

Additive d) comprises, in preferred embodiments, polypropylene homopolymer and copolymer waxes which have not been prepared by means of metallocene catalysis and which have a number-average molecular weight of from 700 to 10 000 g/mol with a dropping point of between 80 and 160° C.

Additive e) comprises, in preferred embodiments, amide waxes preparable by reacting ammonia or ethylenediamine with saturated and/or unsaturated fatty acids. The fatty acids comprise, for example, stearic acid, tallow fatty acid, palmitic acid or erucic acid.

Additive f) comprises, in preferred embodiments, FT paraffins having a number-average molecular weight of from 400 to 800 g/mol with a dropping point of from 80 to 125° C.

Additive g) comprises preferably montan waxes, including acid waxes and ester waxes having a carboxylic acid carbon chain length of from $C_{22}$ to $C_{36}$. The ester waxes preferably comprise reaction products of the montanic acids with monohydric or polyhydric alcohols having from 2 to 6 carbon atoms, such as ethanediol, butane-1,3-diol or propane-1,2,3-triol, for example.

Additive h) comprises, in one preferred embodiment, carnauba wax or candelilla wax.

Additive i) comprises paraffins and microcrystalline waxes which are obtained in petroleum refining. The dropping points for such paraffins are preferably between 45 and 65° C., those of microcrystalline waxes of this kind preferably between 73 and 100° C.

Additive j) comprises, in preferred embodiments, polar polyolefin waxes, preparable by oxidizing ethylene or propylene homopolymer and copolymer waxes or grafting them with maleic anhydride. Particular preference for this purpose is given to starting from polyolefin waxes having a dropping point of between 90 and 165° C., in particular between 100 and 160° C., a melt viscosity at 140° C. (polyethylene waxes) or at 170° C. (polypropylene waxes) of between 10 and 10 000 mPas, in particular between 50 and 5 000 mPas, and a density at 20° C. of between 0.85 and 0.96 g/cm³.

Additive k) comprises, in preferred embodiments, reaction products of sorbitol with saturated and/or unsaturated fatty acids and/or montanic acids. The fatty acids comprise, for example, stearic acid, tallow fatty acid, palmitic acid or erucic acid.

Additive l) comprises preferably ground polyamides, examples being polyamide 6, polyamide 6,6 or polyamide 12. The particle size of the polyamides is preferably in the range of 5–200 μm, especially 10–100 μm.

Additive m) comprises polyolefins, i.e., for example, polypropylene, polyethylene or copolymers of propylene and ethylene of high or low density having molar weights of preferably from 10 000 to 1 000 000 D, in particular from 15 000 to 500 000 D, as the numerical average of the molecular weight, whose particle size as a result of grinding is in the range of preferably 5–200 μm, especially 10–100 μm.

Additive n) comprises thermoplastic PTFE having a molar weight of preferably 500 000–10 000 000 D, especially 500 000–2 000 000 D, as the numerical average, whose particle size as the result of grinding is in the range of preferably 5–200 μm, especially 10–100 μm.

Additive o) comprises amphiphilic compounds which in general lower the surface tension of liquids. The wetting agents comprise, for example, alkyl ethoxylates, fatty alcohol ethoxylates, alkylbenzenesulfonates or betaines.

Additive p) comprises silicates which are not used as filler or pigment in the formulas. It is preferred to use silicas or talc.

The mixing ratio of constituent a) to constituents b) to p) may be varied within the range from 1 to 99% by weight a) to from 1 to 99% by weight b) to p). Where a mixture of two or more of constituents b) to p) is used, the amount indicated applies to the sum of the amounts of these constituents.

In one preferred embodiment the waxes are used in micronized form for the purpose according to the invention. Particular preference is given to the use of polyolefin wax and, where appropriate, admixed auxiliaries and additives in the form of an ultrafine powder having a particle size distribution $d_{90}$<40 μm.

Particular preference is given to the use of polyolefin waxes, in accordance with the invention, for producing colorant concentrates for polypropylene fibers.

Metallocene catalysts for preparing the polyolefin waxes are chiral or nonchiral transition metal compounds of the formula $M^1L_x$. The transition metal compound $M^1L_x$ contains at least one central metal atom $M^1$ attached to which there is at least one π ligand, e.g., a cyclopentadienyl ligand. Additionally, substituents, such as halogen, alkyl, alkoxy or aryl groups, may be attached to the central metal atom $M^1$. $M^1$ is preferably an element from main group III, IV, V or VI of the periodic table of the elements, such as Ti, Zr or Hf. By cyclopentadienyl ligand are meant unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π ligands may be bridged or unbridged, with single and multiple bridging—including bridging via ring systems—being possible. The term "metallocene" also embraces compounds having more than one metallocene fragment, known as polynuclear metallocenes. These may have any desired substitution patterns and bridging variants. The individual metallocene fragments of such polynuclear metallocenes may either be of the same kind or different from one another. Examples of such polynuclear metallocenes are described, for example, in EP-A-632 063.

Examples of general structural formulae of metallocenes and of their activation with a cocatalyst are given, inter alia, in EP-A-571 882.

EXAMPLES

The melt viscosities of the waxes used below were determined using a rotational viscometer in accordance with DGF-M-III 8 (57), the dropping points in accordance with DGF-M-III 3(75) (standards of the Deutsche Gesellschaft für Fettwissenschaft), the densities in accordance with DIN 53479. Used below to define the quality of the dispersing of a pigment in the polyolefin matrix is the filter index, which is defined as follows:

$$D_F = (p_{max} - p_0)/m_{pigment}$$

In accordance with this definition, therefore, the filter index shows the extent of the pressure increase by filtration of a certain amount of dispersed pigments, and hence the extent of the "blocking" of the filter by undispersed or poorly dispersed pigment, based on the amount of pigment employed.

For the production of the pigment masterbatches of the example, a Henschel FM 10 mixer is used which typically takes from 4 to 10 minutes (at room temperature) at from 600 to 1 500 revolutions/min for statistical distribution of the feed components. Actual dispersing (typically one in an iPP matrix) takes place in a corotating twin-screw extruder having a screw length of from 30 to 48 D which operates with a temperature profile of from 30 to 230° C. (feed→die). The rotary speed is between 100 to 550 revolutions/minute, operating with a throughput of from 4 to 30 kg/h.

The table below shows the examples in the case of inventive operation and comparative examples in accordance with the state of the art:

The invention claimed is:

1. A method for dispersing pigments in a polymer matrix comprising the step of adding at least one dispersing auxiliary to the polymer matrix, wherein said at least one dispersing auxiliary is a polyolefin wax synthesized by means of a metallocene catalyst, and wherein the polyolefin wax is derived from ethylene, and wherein the polyolefin wax derived from ethylene is a homopolymer of ethylene or a copolymer of ethylene with one or more linear or branched olefins having 3–18 carbon atoms, wherein the polyolefin wax derived from ethylene has a dropping point of between 90 and 130° C., a melt viscosity at 140° C. of between 10 and 10000 mPa·s, and a density at 20° C. of between 0.89 and 0.98 g/cm$^3$, and wherein the polyolefin wax is an ultrafine powder having a particle size $d_{90} < 40$ μm.

2. The method as claimed in claim 1, wherein the polyolefin wax has a dropping point of from 90 to 130° C., a melt viscosity at 140° C. of from 50 to 5000 mPa·s, and a density of from 0.89 to 0.98 g/cm$^3$.

3. The method as claimed in claim 1, wherein the polyolefin wax is polar-modified.

4. The method as claimed in claim 1, wherein the polyolefin wax is blended with one or more auxiliaries and additives in a polyolefin wax, wherein the one or more auxiliaries and additives is selected from the group consisting of
   a) polyethylene glycol
   b) PE waxes
   c) PTFE waxes
   d) PP waxes
   e) amide waxes
   f) FT paraffins
   g) montan waxes
   h) natural waxes
   i) macrocrystalline and microcrystalline paraffins,
   j) polar polyolefin waxes,
   k) sorbitan esters
   l) polyamides
   m) polyolefins
   n) PTFE.

5. A process for producing a masterbatch of a polymer with a colorant comprising the step of admixing at least one polyoletin wax obtained by metallocene catalysis to the polymer and colorant, wherein the polyolefin wax is derived from ethylene, and wherein the polyolefin wax derived from ethylene is a homopolymer of ethylene or a copolymer of ethylene with one or more linear or branched olefins having 3–18 carbon atoms, wherein the polyolefin wax derived from ethylene has a dropping point of between 90 and 130°

| Formula ingredient | 1 | 2 | 3 | 4 (Comparative) | 5 (Comparative) | 6 (Comparative) |
|---|---|---|---|---|---|---|
| Polyolefin wax | HBM 418/2 | HBM 352/2 | HBM C2-ox | Hiwax ® 420 | Luwax ® A | AC 629 |
| Manufacturer | Clariant | Clariant | Clariant | Mitsui | BASF | Allied Signal |
| Type | Metallocene | Metallocene | Metallocene | Ziegler-PE | LD-PE | Ox. LD-PE |
| Amount | 30% (wt.) | 30% (wt.) | 30% (wt.) | 30% (wt.) | 30% (wt.) | 30% (wt.) |
| Pigment | 30% Pigment Blue 15:1 | 30% Pigment Blue 15:1 | 30% Pigment Blue 15:1 | 30% Pigment Blue 15:1 | 30% Pigment Blue 15:1 | 30% Pigment Blue 15:1 |
| Polyolefin | Escorene ® LL6101 | Escorene ® LL6101 | Escorene ® LL6101 | Escorene ® LL6101 | Escorene ® LL6101 | Escorene ® LL6101 |
| Filter index | 3.4 | 3.6 | 3.4 | 4.6 | 4.8 | 4.6 |

C., a melt viscosity at 140° C. of between 50 and 5000 mPa·s, and a density at 20° C. of between 0.89 and 0.98 g/cm$^3$, and wherein the polyolefin wax is present in as an ultrafine powder having a particle size $d_{90}<40$ μm.

6. A polymer compound comprising at least one pigment and at least one dispersing auxiliary, wherein the at least one dispersing auxiliary is a metallocene catalyzed polyolefin wax, and wherein the polyolefin wax is derived from ethylene, and wherein the polyolefin wax derived from ethylene is a homopolymer of ethylene or a copolymer of ethylene with one or more linear or branched olefins having 3–18 carbon atoms, wherein the polyolefin wax derived from ethylene has a dropping point of between 90 and 130° C., a melt viscosity at 140° C. of between 50 and 5 000 mPa·s, and a density at 20° C. of between 0.89 and 0.98 g/cm$^3$, and wherein the polyolefin wax is present in as an ultrafine powder having a particle size $d_{90}<40$ μm.

7. The method as claimed in claim 4, wherein weight ratio of the polyolefin wax to the one or more auxiliaries and additives is from 1:99 to 99:1.

8. A masterbatch made in accordance with the process of claim 5.

9. The method according to claim 1, wherein one or more linear or branched olefins have 3 to 6 carbon atoms.

10. The method according to claim 1, wherein the polyolefin wax derived from ethylene is selected from the group consisting of propane, 1-butene, 1-hexene, 1-octane or 1-octadecene, and styrene.

11. The method according to claim 6, wherein one or more linear or branched olefins have 3 to 6 carbon atoms.

12. The method according to claim 6, wherein the polyolefin wax derived from ethylene is selected from the group consisting of propane, 1-butane, 1-hexene, 1-octane or 1-octadecene, and styrene.

13. The method of according to claim 1, wherein the polyolefin wax derived from ethylene has a dropping point of between 100 and 120° C., and a density at 20° C. of between 0.91 and 0.94 g/cm$^3$.

14. The method of according to claim 5, wherein the polyolefin wax derived from ethylene has a dropping point of between 100 and 120° C., and a density at 20° C. of between 0.91 and 0.94 g/cm$^3$.

15. The method of according to claim 6, wherein the polyolefin wax derived from ethylene has a dropping point of between 100 and 120° C., and a density at 20° C. of between 0.91 and 0.94 g/cm$^3$.

* * * * *